No. 643,852. Patented Feb. 20, 1900.
L. H. SOENS.
HORSE HAY FORK.
(Application filed Oct. 18, 1899.)
(No Model.)
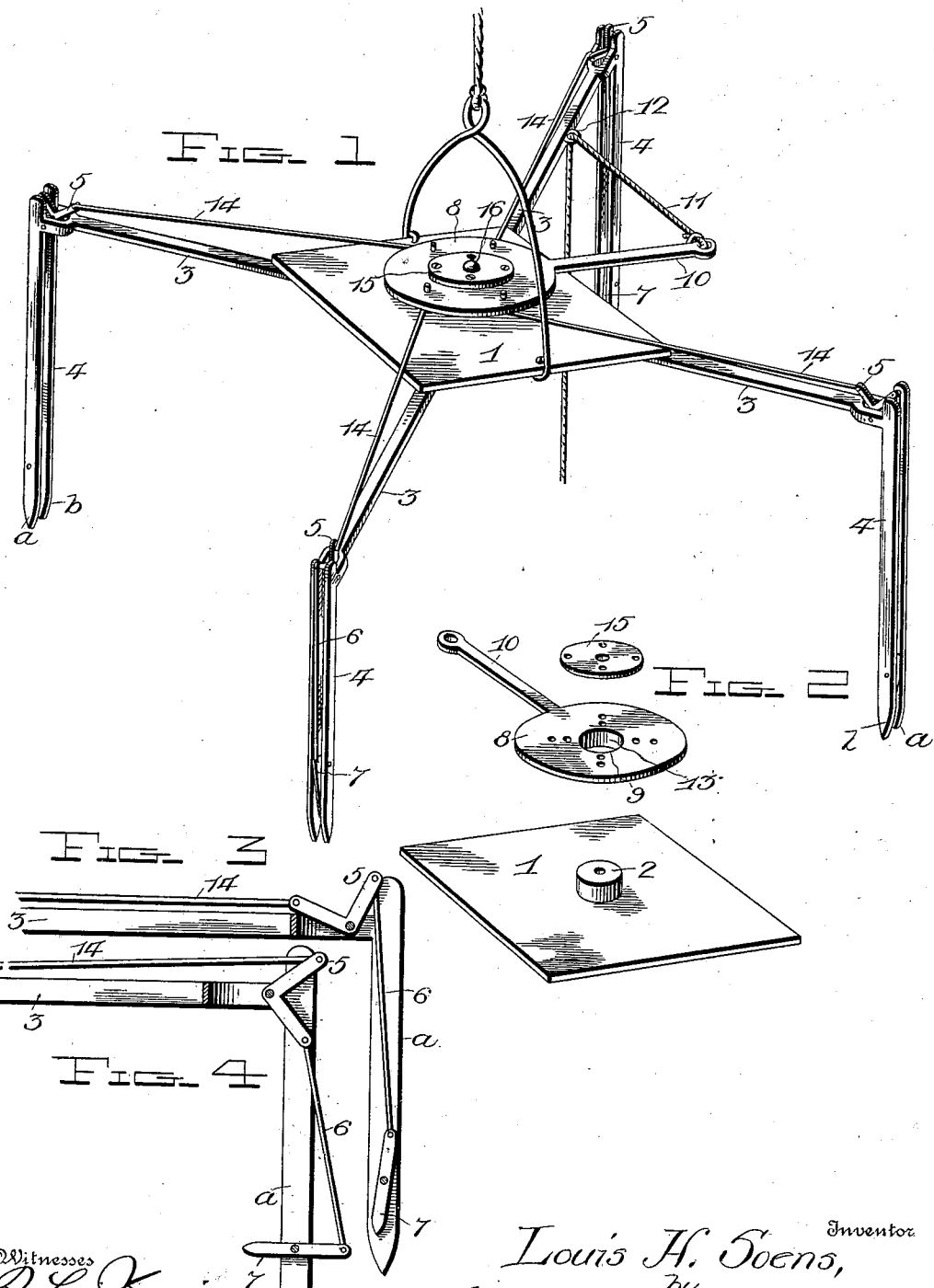
Witnesses
Inventor
Louis H. Soens,
by
H. B. Willson & Co.
Attorneys

UNITED STATES PATENT OFFICE.

LOUIS H. SOENS, OF MANCOS, COLORADO.

HORSE HAY-FORK.

SPECIFICATION forming part of Letters Patent No. 643,852, dated February 20, 1900.

Application filed October 18, 1899. Serial No. 733,971. (No model.)

*To all whom it may concern:*

Be it known that I, LOUIS H. SOENS, a citizen of the United States, residing at Mancos, in the county of Montezuma and State of Colorado, have invented certain new and useful Improvements in Horse Hay-Forks; and I do declare the following to be a full, clear, and exact description of the invention, such as will enable others skilled in the art to which it appertains to make and use the same.

The invention relates to horse hay-forks.

The object of the invention is to provide a fork of this character which shall be simple of construction, durable in use, and comparatively inexpensive of production, and capable of lifting a large load of hay.

To this end the invention consists in certain features of construction and combination of parts which will be hereinafter fully described and claimed.

In the accompanying drawings, Figure 1 is a perspective view of my improved hay-fork. Fig. 2 is a detail view of the plate or frame of the fork, the retaining-disk, and its securing-washer, the parts being separated. Fig. 3 is a detail view of one of the tines, showing the barb arranged in vertical position. Fig. 4 is a similar view showing the barb extending horizontally or at right angles to the length of the tine.

In the drawings the same reference characters indicate the same parts of the invention.

1 denotes the plate or frame of the fork, which is preferably rectangular in construction and is provided with a central fixed boss 2.

3 denotes arms bolted to the under side of the plate or frame 1, and to the outer ends of these arms are secured the downwardly-extending tines 4, each of which consists of two parts *a* and *b*. A bell-crank lever 5 is pivoted to the end of each arm 3 and is connected by a link 6 to the barb 7, between the lower ends of the pieces *a* and *b* of each tine.

8 denotes a disk having a central aperture 9 to receive the boss 2. This disk is provided with an arm 10, to which is secured a rope 11, which passes through a screw-eye 12, secured to one of the arms 3. This rope extends to within convenient reach of the operator. Surrounding the central aperture 9 of the disk and projecting downward therefrom is an integral collar 13. This collar serves to support the disk slightly above the plate 1 to permit of the engagement with said disk of rods 14, which have their inner ends bent upward and projecting through apertures in said disk and having their outer ends pivoted to the upper limbs of the bell-crank levers 5.

15 denotes a cap or washer which is secured to the boss 2 by a bolt or screw 16. This washer serves to hold the disk to the boss and permit of its rotation.

In operation the fork, with its barbs arranged in the position shown in Fig. 3, is forced into the load of hay. Then by drawing upon the operating-rope 11 the barbs are caused to assume the position shown in Fig. 4, in which position they will hold the mass of hay. After the fork has been elevated and moved to the place where it is desired to discharge the hay by releasing the cord the weight of the hay will cause the barbs to move to the position shown in Fig. 3, thus freeing them from the hay and allowing it to be discharged.

From the foregoing description, taken in connection with the accompanying drawings, a further explanation of the invention is not deemed necessary. It is apparent that the device is exceedingly simple, may be made at small cost, and is well adapted for the purpose for which it is designed, and it will be of course understood that various changes in the form, proportion, and the minor details of construction may be resorted to without departing from the principle or sacrificing any of the advantages of this invention.

Having thus described the invention, what is claimed, and desired to be secured by Letters Patent, is—

The combination with the frame, of arms projecting horizontally from said frame and provided with tines, a disk having a central aperture and a depending collar to engage said boss and support the disk a slight distance above the frame, means for operating the disk, barbs pivoted to said tines, bell-crank levers pivoted to said arms, links connecting the bell-crank levers with the barbs, and rods connecting the disk with the bell-crank levers.

In testimony whereof I have hereunto set my hand in presence of two subscribing witnesses.

LOUIS H. SOENS.

Witnesses:
  W. H. KELLEY,
  E. N. LOWE.